United States Patent [19]
O'Hare et al.

[11] Patent Number: 6,073,949
[45] Date of Patent: Jun. 13, 2000

[54] SLIDER BEAM SUSPENSION SYSTEM FOR A BICYCLE SEAT

[75] Inventors: Brady J. O'Hare; Michael G. Allsop, both of Bellingham, Wash.

[73] Assignee: Softride, Inc., Bellingham, Wash.

[21] Appl. No.: 09/145,375

[22] Filed: Sep. 1, 1998

[51] Int. Cl.[7] .................................................. B62K 19/36
[52] U.S. Cl. .......................................... 280/283; 267/132
[58] Field of Search ................................ 280/281.1, 283, 280/274, 275; 297/196; 267/2, 192, 193, 201, 36.1, 41, 131, 132, 133

[56] References Cited

U.S. PATENT DOCUMENTS

| | | |
|---|---|---|
| D. 325,008 | 3/1992 | Allsop et al. . |
| D. 329,409 | 9/1992 | Allsop et al. . |
| 396,083 | 1/1889 | Harris . |
| 496,093 | 4/1893 | Okey . |
| 527,404 | 10/1894 | Byrne . |
| 635,709 | 10/1899 | Andrew . |
| 1,193,977 | 8/1916 | Bereth . |
| 1,205,828 | 11/1916 | Whaley . |
| 1,395,974 | 11/1921 | Redfield . |
| 1,416,942 | 5/1922 | Brooks . |
| 1,442,643 | 1/1923 | Brooks . |
| 1,469,136 | 9/1923 | Ziska, Jr. . |
| 1,469,227 | 10/1923 | Lawrence . |
| 1,473,462 | 11/1923 | Champ et al. . |
| 1,580,414 | 4/1926 | Cozzolino et al. . |
| 2,244,709 | 6/1941 | Kinzel . |
| 4,934,724 | 6/1990 | Allsop et al. . |
| 5,029,888 | 7/1991 | Allsop et al. . |
| 5,240,268 | 8/1993 | Allsop et al. . |
| 5,308,030 | 5/1994 | Bales ..................................... 248/214 |
| 5,332,246 | 7/1994 | Buell . |
| 5,346,235 | 9/1994 | Holman . |
| 5,356,165 | 10/1994 | Kulhawik et al. . |
| 5,382,038 | 1/1995 | Allsop et al. . |
| 5,411,280 | 5/1995 | Allsop et al. . |
| 5,456,481 | 10/1995 | Allsop et al. . |
| 5,474,317 | 12/1995 | Piszkin . |
| 5,489,139 | 2/1996 | McFarland . |
| 5,611,557 | 3/1997 | Farris et al. .............................. 280/275 |

FOREIGN PATENT DOCUMENTS

| | | |
|---|---|---|
| 453128 | 5/1913 | France . |
| 540517 | 7/1922 | France . |
| 617119 | 2/1927 | France . |
| 464371 | 3/1948 | France . |
| 1308798 | 10/1962 | France . |
| 164930 | 9/1904 | Germany . |
| 336181 | 4/1921 | Germany . |
| 680504 | 10/1952 | Germany . |
| 1 011 305 | 6/1957 | Germany . |
| 1405350 | 3/1970 | Germany . |
| 4101998-A1 | 7/1992 | Germany . |
| 9788 | 7/1923 | Nauru . |

OTHER PUBLICATIONS

Advertisement; "Radical Bob"; *Bicycling;* Jul. 1995 issue; p. 35.

Advertisement; "Elroy™, Aligned Reaction Technology," *Mountain Biking;* Aug. 1996; p. 101.

*Primary Examiner*—Kevin Hurley
*Attorney, Agent, or Firm*—Christenson O'Connor Johnson & Kindness PLLC

[57] ABSTRACT

A bicycle (10) including a novel suspension system (30) for supporting a bicycle seat (32). The suspension system (30) includes an elongate beam (34) rotatably attached at one end to the down tube (26) of the bicycle (10) and extending upwardly and rearwardly therefrom. The seat (32) is attached to the distal end of the elongate beam (34). A slider (36) is attached to the down tube (26) at a location below the attachment of the elongate beam (34) to the down tube. The slider (36) includes a sleeve (38) that extends around the elongate beam (34). A shock absorber (40) is juxtaposed between the sleeve (38) and the elongate beam (34). By pressing downward on the seat (32), elongate beam (34) and the slider (36) rotate along their respective attachments to the down tube (26) and the sleeve (38) slides along the elongate beam (34). The shock absorber (40) slows and controls this sliding motion so that a shock absorber is created for the seat (32).

26 Claims, 10 Drawing Sheets

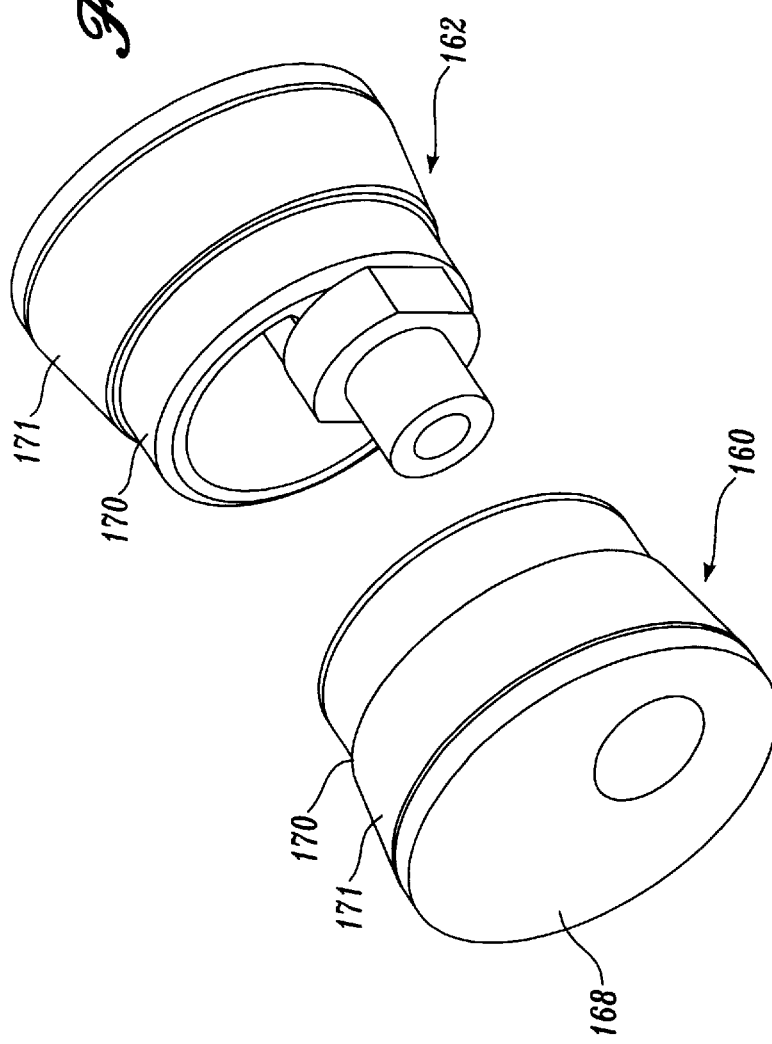
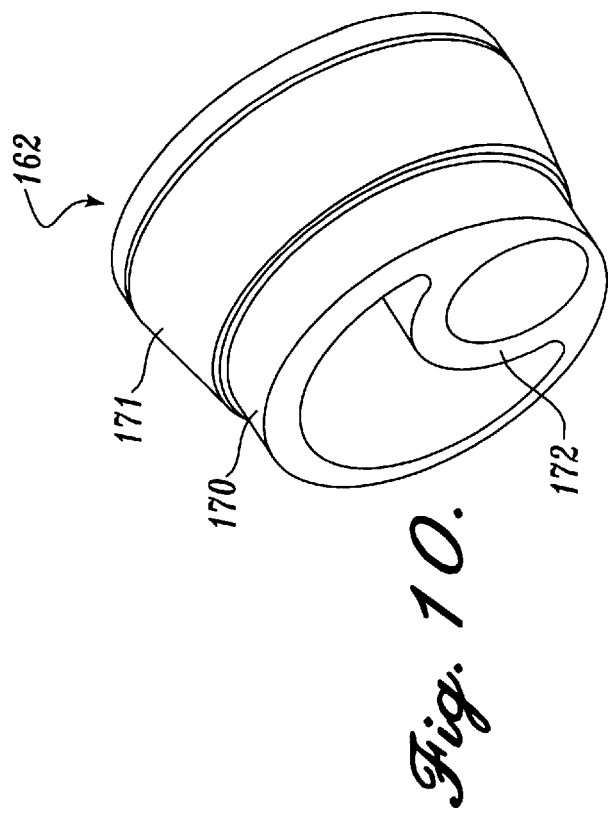

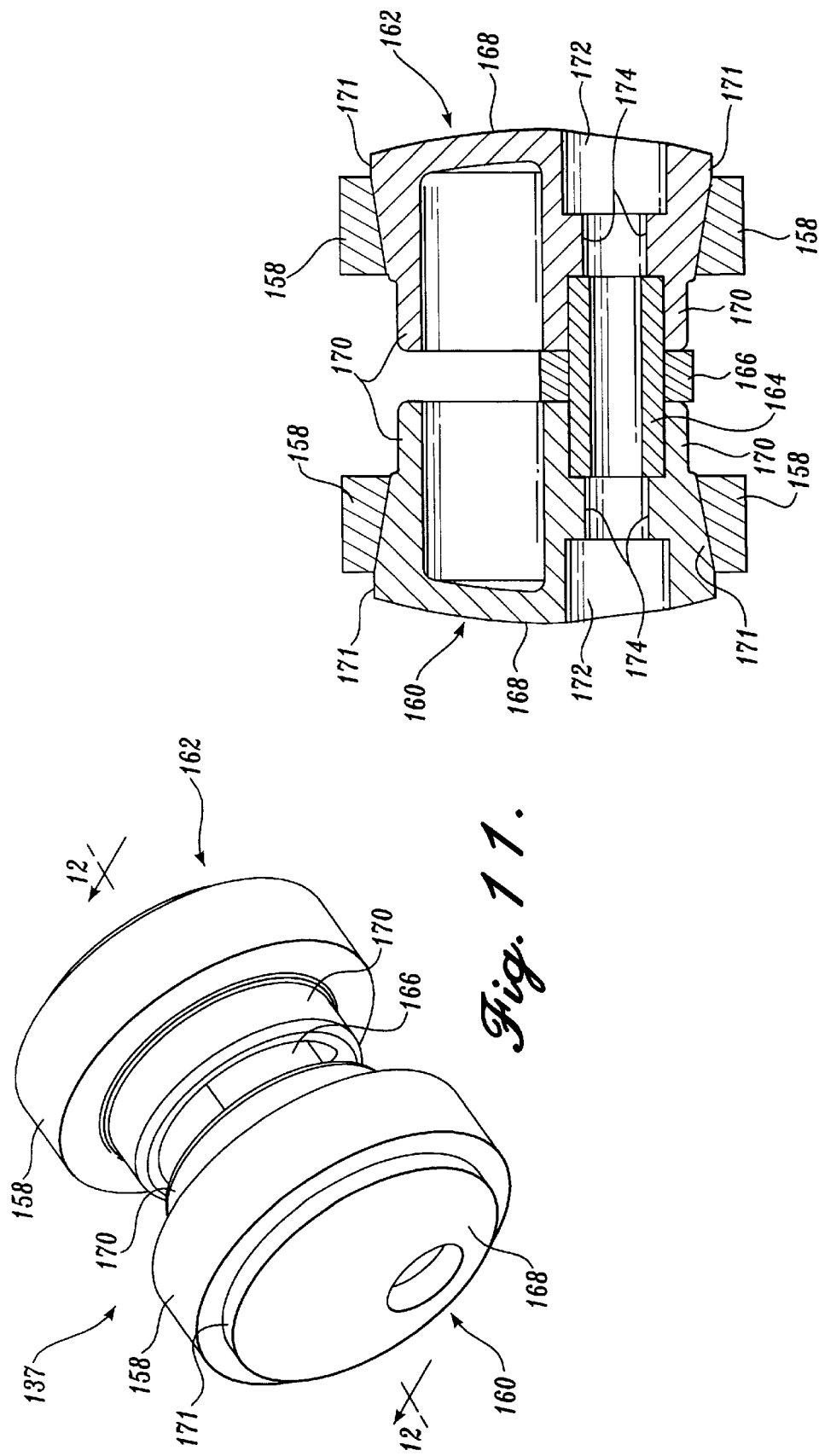

SLIDER BEAM SUSPENSION SYSTEM FOR A BICYCLE SEAT

FIELD OF THE INVENTION

This invention relates to bicycles and, more specifically, relates to a bicycle seat suspension system.

BACKGROUND OF THE INVENTION

Eliminating vibration and shocks to smooth the ride for a person sitting upon a vehicle traveling over rough ground has been a serious problem since the development of the first vehicle. Solutions have typically involved isolating the wheels of the vehicle from the vehicle frame by means of springs and shock absorbers, as well as spring mounting the vehicle seat on the vehicle frame. In automobiles and tractors, for example, seats have been mounted using both coil springs, leaf springs, and combinations thereof.

Referring particularly to the bicycle art, wherein the present invention has relevant application, the seat support almost universally takes the form of a rigid seat post inserted into a hollow vertical tube of a rigid bicycle frame. A seat, which may include a form of resilient spring cushioning, is mounted to the top of the seat post.

A number of prior art bicycles have incorporated shock absorbing systems within the frames to absorb vibration and shocks. For example, U.S. Pat. No. 5,356,165 to Kulhawic et al. discloses a bicycle that has a two-piece frame, with the two pieces of the frame separated by a shock absorber. Other prior art bicycle designs have incorporated shock absorbers in the forks or in other portions of the bicycle frame.

A few designs of prior art bicycles incorporate seat suspension systems that include shock absorbers beneath seat supporting beams. An example of one of these bicycles is disclosed in U.S. Pat. No. 496,093 to Okey. The Okey patent discloses a seat suspension beam pivotally secured near the head tube of a bicycle and suspended with a helical coil spring shock absorber.

U.S. Pat. No. 4,934,724 to Allsop et al. teaches a unique way of providing support for a bicycle seat. The Allsop patent discloses an elongate seat support formed by an elastomeric member sandwiched between two composite beams. One end of the elongate support is attached to the bicycle frame. The seat is supported at the cantilevered opposite end of the elongate support.

The elongate seat support disclosed in the Allsop patent is particularly advantageous in that the composite beams and the elastomeric material allow for two different types of shock absorbing action. Suspension action in the bicycle introduces shear stress in the elastomeric member, which provides damping of low amplitude modulation of the frame. Shock absorption is provided by the beams as they flex relative to one another and relative to the bicycle frame. Thus, the elastomeric material provides damping of smaller, low amplitude vibrations in the bicycle, while the beams provide shock absorption from low and high amplitude vibrations.

The elongate seat support disclosed in the Allsop patent offers a type of suspension not available in other prior art designs. Because the elongate seat support utilizes suspension of the seat and rider, and not separate frame pieces, substantially all of the rider's pedaling efforts are transferred to the wheel. For example, the bottom bracket of the bicycle, to which the crank assembly is mounted, is rigidly connected to the axle for the rear wheel. The rear wheel does not include a suspension system, so none of the rider's pedaling efforts are wasted on suspension action. In addition, because there are no shocks or suspension elements in the front forks, the front wheel is rigidly connected to the frame. This rigid connection permits optimal steering efficiency for the bicycle.

Although the elongate seat support in the Allsop patent provides optimal pedaling and steering efficiency, there exists a need for a bicycle suspension that provides the advantages taught by the Allsop patent but is less expensive to manufacture and is lighter in weight.

SUMMARY OF THE INVENTION

In accordance with the present invention, a suspension system for suspending a seat of a vehicle is provided. The suspension system includes a slider and an elongate beam. The elongate beam includes first and second ends. The first end of the elongate beam has a first pivotal mount for attaching to a vehicle. The slider has a second pivotal mount for attaching to a vehicle, and includes a sleeve spaced from the first pivotal mount. The elongate beam is sidably received within the sleeve of the slider. A seat mount is attached adjacent to the second end of the elongate beam. The suspension system further includes means for restricting sliding of the sleeve of the slider along the elongate beam.

In accordance with further aspects of the present invention, the suspension system is configured for attachment to a down tube of a bicycle.

In accordance with another aspect of the present invention, the first pivotal mount is arranged above the second pivotal mount.

In accordance with still other aspects of the present invention, the second pivotal mount is horizontally distanced further from the seat mount than the first pivotal mount.

In accordance with yet other aspects of the present invention, the means for restricting sliding comprises a shock absorber juxtaposed between the sleeve of the slider and the elongate beam.

In accordance with still another aspect of the present invention, the shock absorber comprises an elastomeric material.

In accordance with yet another aspect of the present invention, the first pivotal mount includes a clamp for selectively attaching the slider to a vehicle at at least two different locations whereby the location of the first pivotal mount is adjustable.

In accordance with other aspects of the present invention, the seat suspension system includes means for adjusting the length of the beam intermediate the sleeve and the first end of the elongate beam.

In accordance with another aspect of the present invention, the elongate beam includes (1) a first rod extending from the first end of the elongate beam to a point intermediate the sleeve and the first end, (2) a second rod extending from the first rod to the second end of the elongate beam, and (3) an adjustable connector for selectively adjusting the length between the first and second rods, whereby the length of the elongate beam can be selectively adjusted.

In accordance with yet another aspect of the present invention, the first and second rods include opposite direction external threads on the ends of the first and second rods closest to one another, and the connector comprises a cylinder having internally-threaded ends that match the threads of the first and second rods.

In accordance with another aspect of the present invention, a vehicle is provided. The vehicle includes a frame member, a slider, and an elongate beam. The elongate beam includes first and second ends, the first end pivotally mounted to the frame member at a first pivot point. The slider is pivotally mounted at a second pivot point on the frame member, and includes a sleeve spaced from the pivot point. The elongate beam is slidingly received within the sleeve of the slider. A seat mount is attached to the second end of the elongate beam. The vehicle further includes means for restricting sliding of the sleeve of the slider along the elongate beam.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 9 is an isometric exploded view of the lower pivot for use in the seat suspension system of FIG. 8;

FIG. 10 is an isometric view of the right half of the lower pivot of FIG. 9;

FIG. 11 is an assembled drawing of the lower pivot of FIG. 9, shown extending into bosses on the down tube of FIG. 8;

FIG. 12 is a sectional view taken along the section lines 12—12 of FIG. 8; and

DETAILED DESCRIPTION OF THE PREFERRED EMBODIMENT

Figure 1:
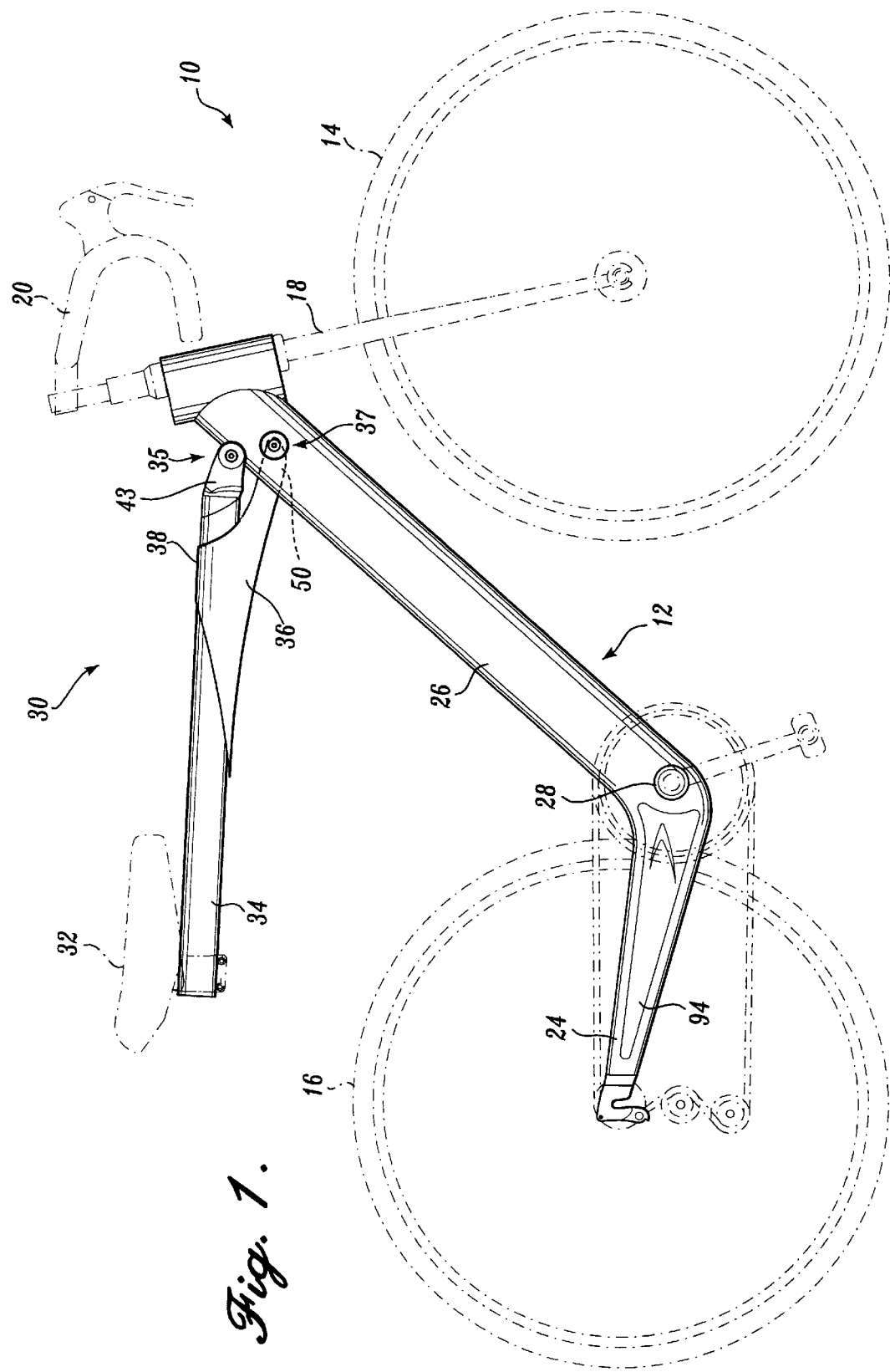
FIG. 1 is a side view of a bicycle incorporating the seat suspension system of the present invention.

Referring now to the drawing, in which like reference numerals represent like parts throughout the several views, FIG. 1 sets forth a bicycle 10 incorporating the present invention. The bicycle 10 includes a frame 12 having a front wheel 14 (shown in phantom lines) and a rear wheel 16 (also shown in phantom lines) attached thereto. The front wheel 14 is attached to the frame 12 by a front fork 18 (phantom), which is rotatably carried by the frame. The orientation of the front fork 18 and front wheel 14 is controlled by rotation of a top handlebar assembly 20 (phantom). The rear wheel 16 is attached to chain stays 24 (only one of which is shown, but the other of which is a mirror image thereof), which are part of the frame 12. A down tube 26, which is also a part of the frame 12, extends from the left and right chain stays 24 to the handlebar assembly 20. A central bracket 28 is located at the juncture of the left and right chain stays 22,24 and the down tube 26.

The bicycle 10 includes a novel suspension system 30 for supporting a bicycle seat 32 (phantom). Briefly described, the suspension system 30 includes an elongate beam 34 pivotally attached at a first upper pivot 35 to the down tube 26 and extending slightly upwardly and rearwardly therefrom. The seat 32 is attached to the distal end of the elongate beam 34. A slider 36 is pivotally attached at a second lower pivot 37 to the down tube 26 at a location below the attachment of the elongate beam 34 to the down tube. The slider 36 includes a sleeve 38 that extends around the elongate beam 34.

The elongate beam 34 can be formed of carbon tubing, extruded aluminum, steel tubing or any other suitable material. Likewise, the slider 36 can be formed of one or more of these materials or another material that has desired material characteristics. The slider 36 and the sleeve 38 are preferably extruded as one piece, but could be welded together or formed in any conventional manner.

A shock absorber 40 (FIG. 3) is juxtaposed between the sleeve 38 and the elongate beam 34. As described in detail below, the shock absorber 40 acts as both a spring and a damper. By pressing downward on the seat 32, the elongate beam 34 and the slider 36 rotate at the respective pivots 35, 37 downward along a plane containing both the slider 36 and the elongate beam 34. During this rotation, the sleeve 38 slides along the elongate beam 34. The shock absorber 40 provides a shear layer that serves to slow and control this sliding motion so that a spring is created for the seat 32. In addition, the shock absorber 40 serves as a damper, or layer of vibration and shock absorbing material, between the sleeve 38 and the elongate beam 34.

In a preferred embodiment, the material used for the shock absorber 40 will have a low durometer hardness and will be "elastomeric" in nature. As used herein, "elastomeric" is meant to describe a material that easily resumes its natural shape after deformation or compression. The elastomeric qualities of the shock absorber 40 permit the shock absorber to be deformed, sheared, or compressed by relative movement between the slider 36 and the elongate beam 34 and to absorb the kinetic energy of the relatively moving elongate beam and slider.

The shock absorber 40 has a memory for its original shape, and resiliently returns the slider 36 and the elongate beam 34 into their original configuration over a brief period of time. The shock absorber 40 preferably has a tendency to resist shear, deformation or compression, thus slowing the relative movement of the elongate beam 34 relative to the sleeve 38. An elastomer made of polyurethane, having viscoelastic properties such that the sliding of the elongate beam 34 within the sleeve 38 is resisted has been found to be a satisfactory material. Many materials having a relatively low durometer of elasticity, and formed either in a layer or in other configurations sandwiched between or otherwise interconnected to the sleeve 38 and the elongate beam 34 are also satisfactory for use in this invention.

The shock absorber 40 is preferably formed by injecting polyurethane between the sleeve 38 and the elongate beam 34. The shock absorber 40 fills the space between the sleeve 38 and the elongate beam 34. The adhesive characteristics of the polyurethane causes it to attach permanently to the inside of the sleeve 38 and the outer surface of the elongate beam 34. After the polyurethane has been injected, the excess is trimmed around the edges of the sleeve. A shock absorber 40 of this material is preferably about ⅛-inch thick.

The slider 36 and elongate beam 34 are preferably arranged so that downward pressure on the seat 32 causes the sleeve 38 to slide along the elongate beam 34 and shear the shock absorber 40, as opposed to compressing the shock absorber 40. In addition, as described below, by arranging the lower pivot 37 at a point forward of the upper pivot 35, levering action is increased and shearing of the shock absorber 40 is maximized.

The shock absorber 40's resistance to shear can be increased by changing a number of different factors. Increasing the thickness of the shock absorber 40 between the elongate beam 34 and the sleeve 38, shortening the length of the shock absorber 40 or the sleeve 38, decreasing the angle at which the slider 36 engages the elongate beam 34, moving the lower pivot 37 more forward relative to the upper pivot 35 (described below), and increasing the spacing of the sleeve 38 from the pivot pin 42, each increase the shearing ability of the shock absorber 40.

Figure 2:
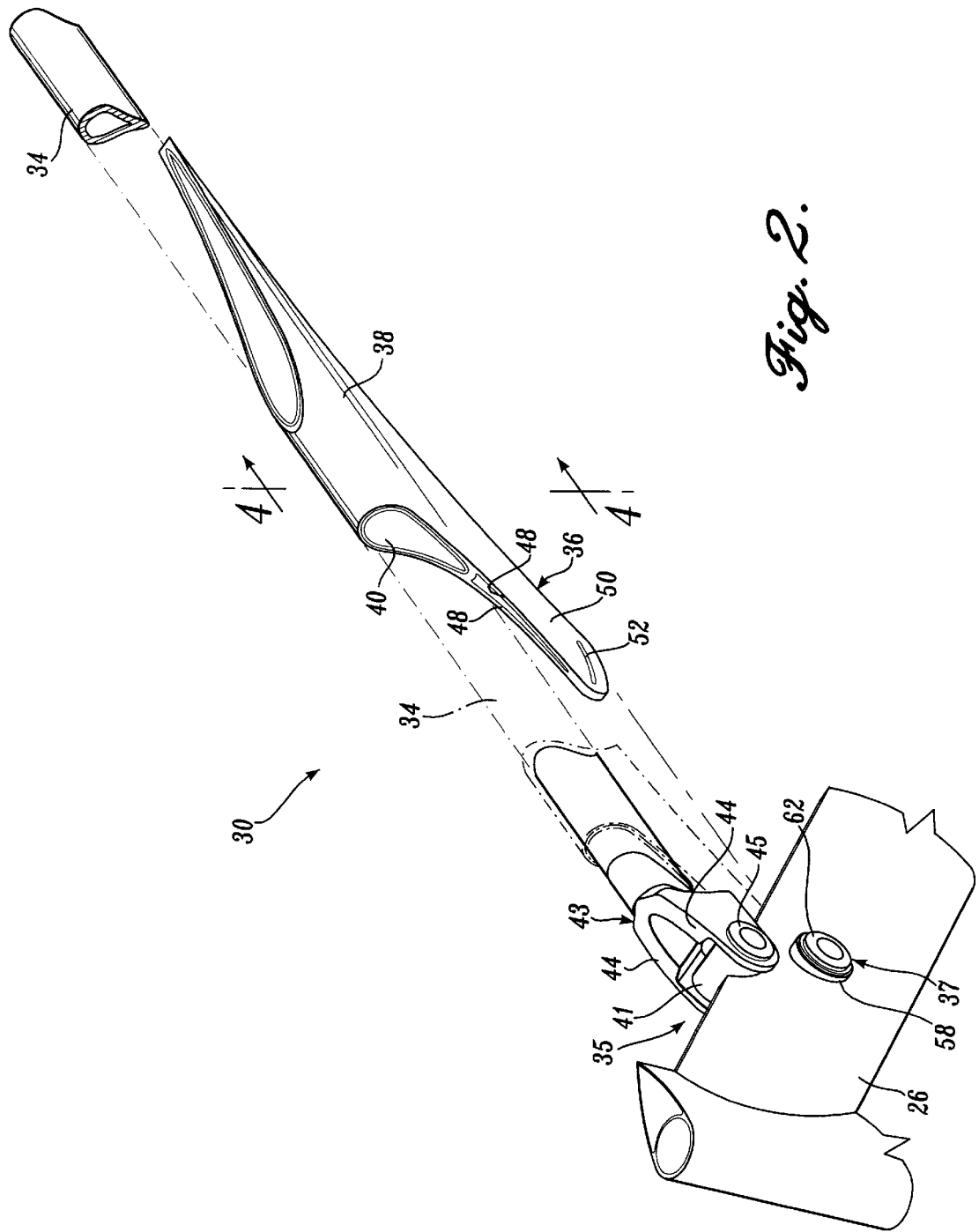
FIG. 2 is a partially exploded isometric view of the seat suspension system of FIG. 1.
Figure 5:
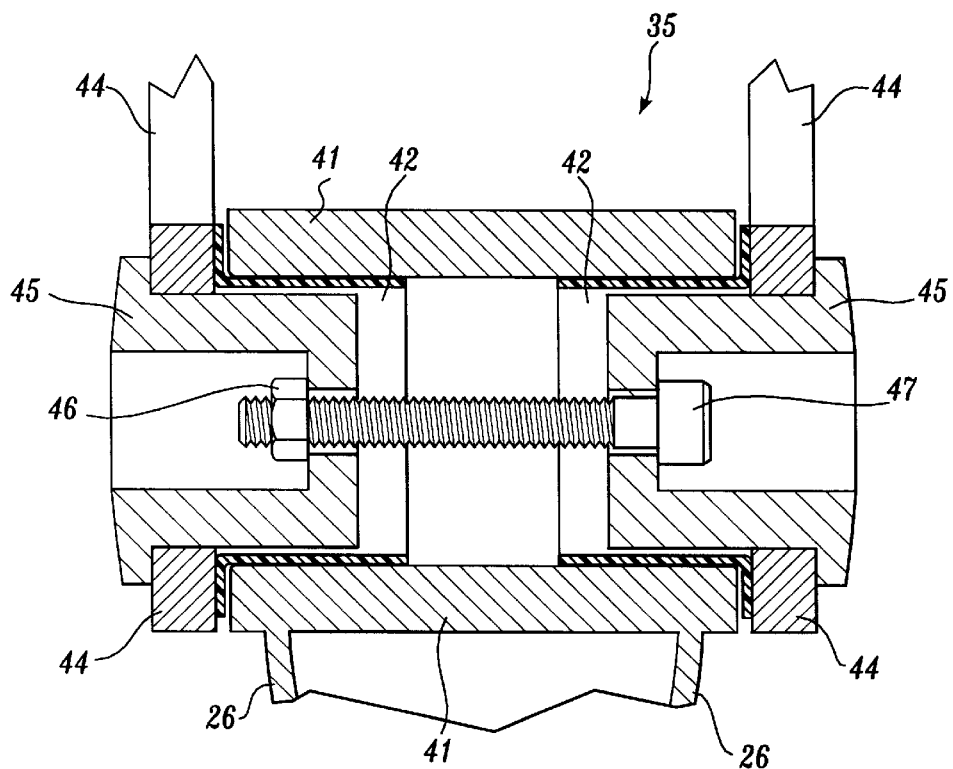
FIG. 5 is a sectional view taken along the section lines 5—5 of FIG. 3.

A detail of the attachment of the elongate beam 34 to the upper pivot 35 is shown in FIG. 5. A hollow cylinder 41 (FIG. 2) extends transversely across the top edge of the down tube 26. Bearings 42 are pressed into opposite ends of the hollow cylinder 41. The leading end of the elongate beam 34 (closest to the down tube 26) is fitted into a clevis 43. The clevis 43 includes a pair of flanges 44 that extend outside and over the bearings 42 on opposite sides of the hollow cylinder 41 (best shown in FIG. 2). Pins 45 extend through the holes (not shown) in the flanges 44 and into the bearings 42 and the hollow cylinder 41. A nut 46 and a bolt 47 extend through the two pins 45 and urge the two pins toward one another. The bolt 47 is tightened so that the pins 45 and the flanges 44 of the clevis are held snugly against the bearings 42, but are loose enough to allow free rotation of the flanges 44 along the bearings 42. The clevis 43 is thus mounted for free rotation about the upper pivot 35.

The elongate beam 34 extends into a sleeve (not shown) at the distal end of the clevis 43 and is rigidly connected thereto. The clevis 43 can be formed of cast aluminum, steel, or any other material. The elongate beam 34 is attached to the clevis by an adhesive, welding, fasteners, friction fit, or any other suitable method.

Figure 3:
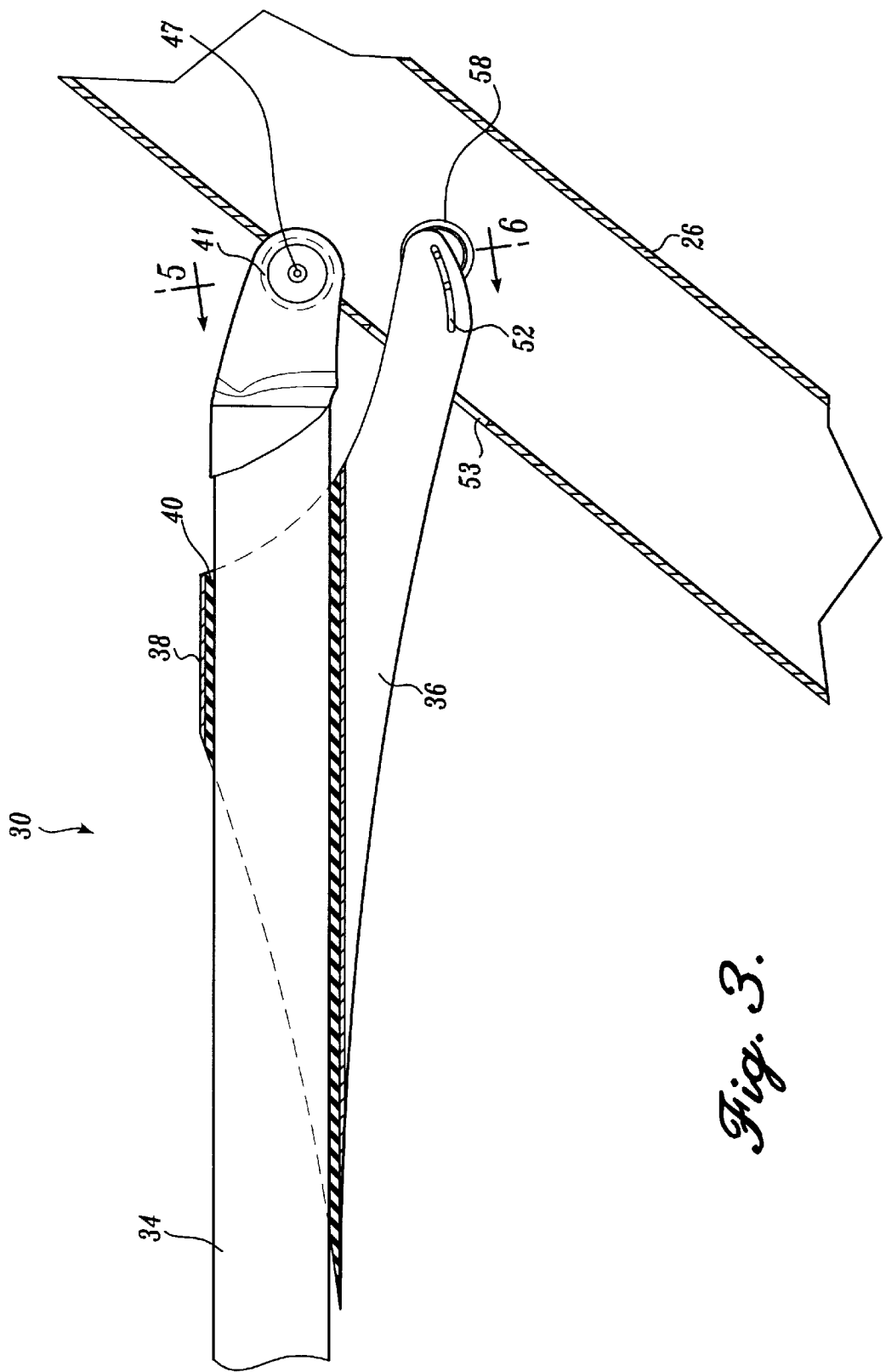
FIG. 3 is a side view of the slider and elongate beam of the seat suspension system of FIG. 1, with part of the slider and part of the down tube of the bicycle removed for detail.
Figure 4:
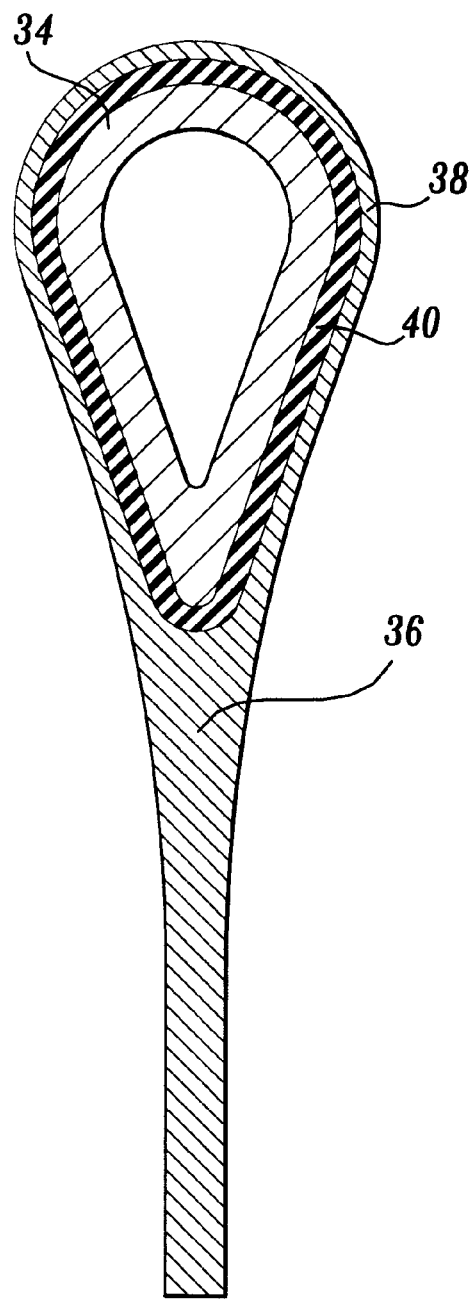
FIG. 4 is a sectional view taken along the section lines 4—4 of FIG. 2.
Figure 6:
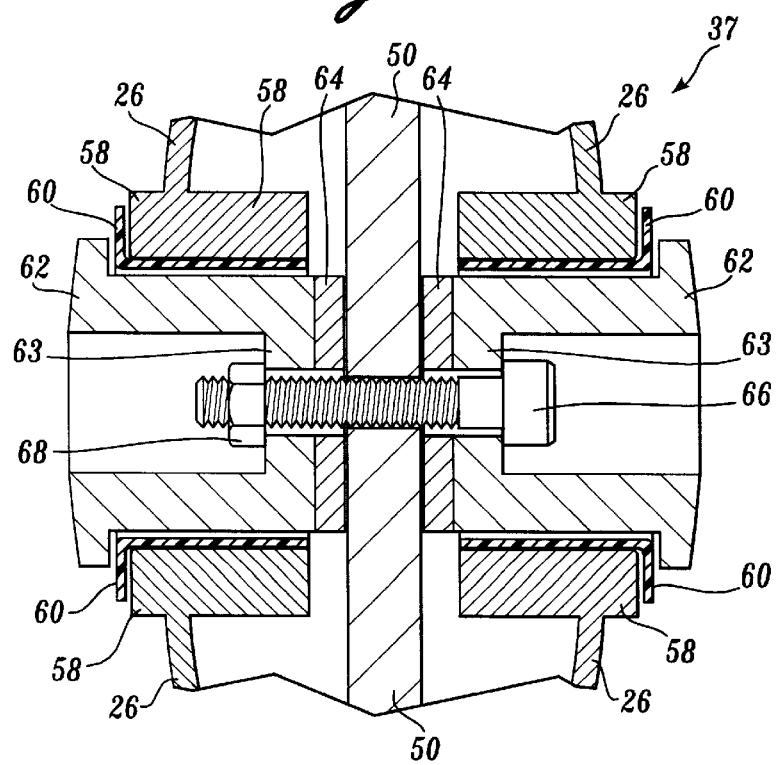
FIG. 6 is a sectional view taken along the section lines 6—6 of FIG. 3.

A detail of the attachment of the slider 36 to the lower pivot 37 is shown in FIG. 6. The slider 36 includes flanges 48 (FIG. 2) that extend downwardly from opposite sides of the sleeve 38. The flanges 48 join together at their bottom edges to form a dog ear 50. The dog ear 50 includes an arcuate slot 52 (FIG. 3) having a radius extending from the pivot pin 35. The dog ear 50 fits into a slot 53 (a cutaway portion which is shown in FIG. 3) in the down tube 26. As described in detail below, the lower pivot 37 acts as a clamp and holds the dog ear 50 within the slot 53 and permits pivoting of the slider 36 about the lower pivot 37.

The lower pivot 37 is designed so that it allows pivoting motion of the flange 48 about the lower pivot 37, but can be selectively locked at different locations along the arcuate slot 52. A structure for the lower pivot 37 that provides this function is shown in FIG. 6. The lower pivot 37 fits within bosses 58 formed in the down tube 26. The bosses 58 are reinforced round bores formed integral with the down tube 26 that extend from opposite sides of the down tube 26 into the slot 53. Bearings 60 are pressed into the bosses 58. Aluminum pins 62 that have an external diameter that matches the internal diameter of the bearings 60 are seated within the bearings 60. The aluminum pins 62 include rear flanges 63 having holes therethrough. Steel pems 64 are attached at the back of the rear flanges 63. A shoulder bolt 66 extends from within one of the aluminum pins 62, though the rear flange 63 and steel pem 64 of the aluminum pin, through the arcuate slot 52 on the dog ear 50, and out of the steel pem and rear flange of the other aluminum pin. A nut 68 is fitted on the distal, threaded end of the shoulder bolt 66.

By tightening the nut 68 onto the shoulder bolt 66, the steel pems 64 are forced against the sides of the dog ear 50. The steel pems 64 grip the outer surfaces of the dog ear 50 of the slider 36 and prevent movement of the slider relative to the steel pems and the aluminum pins 62. However, the slider 36 is free to pivot, along with the aluminum pins 62, about the axis of the shoulder bolt 66. During this pivoting movement, the aluminum pins 62 rotate within the bearings 60. The contact of the pems 64 with the dog ear 50 prevent movement of the slider 36 relative to the aluminum pins 62.

The bolt 66 is preferably a cap head bolt provided with hex-shaped internal recess (not shown, but well-known in the art). A hex key (also not shown) can be inserted into the hex-shaped internal recess to tighten or loosen the nut 68 and the bolt 66. By loosening the nut 68 and the bolt 66, the pems 64 release the dog ear 50, and the slider 36 can be moved relative to the lower pivot 37. During this movement, the shoulder bolt 66 remains within the arcuate slot 52. Thus, movement of the slider 36 relative to the lower pivot 37 is restricted to a sliding movement of the arcuate slot 52 along the shoulder bolt 66. The function of this feature will be described in detail below.

The lower pivot 37 is preferably spaced horizontally further from the seat 32 than the upper pivot 35. That is, the lower pivot 37 is located further forward on the frame than the upper pivot 35. By arranging the lower pivot 37 and the upper pivot 35 in this manner, pressing down on the seat 32 causes the sleeve 38 to slide on the elongate beam 34, causing the shock absorber 40 to shear and deform. It has been found that if the lower pivot 37 is not located forward of the upper pivot 35, the shock absorber 40 has a tendency to compress instead of shear. Thus, although the seat suspension system 30 will work, the full benefit of the shock absorber 40 is not realized unless the lower pivot 37 is located forward of the upper pivot 35. In a preferred embodiment, the lower pivot 37 is located approximately ¼-inch ahead of the upper pivot 35. However, this distance could be increased or decreased to provide a desired performance.

Figure 7:
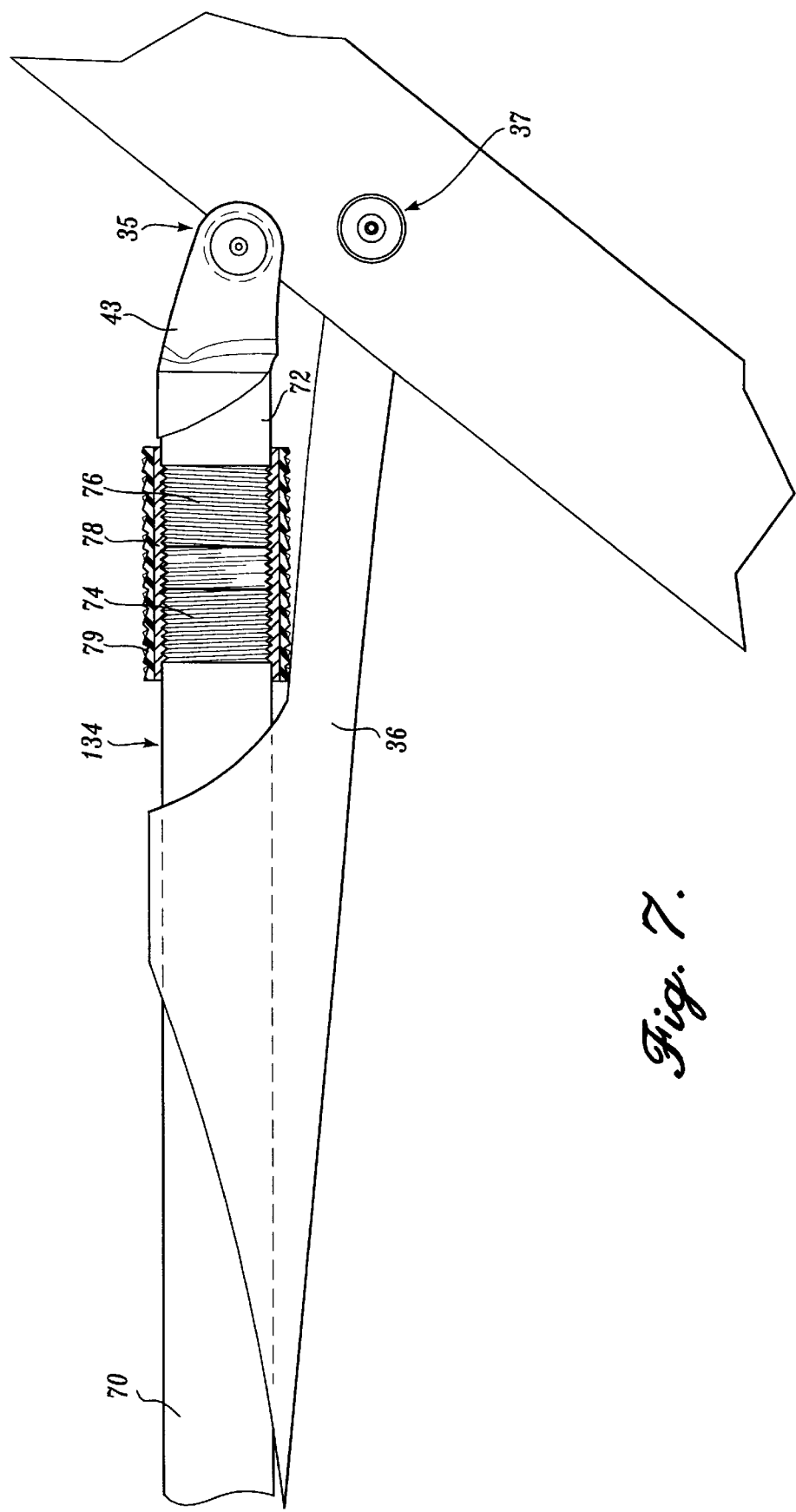
FIG. 7 is a side view of an alternative embodiment of a seat suspension system in accordance with the present invention.

FIG. 7 sets forth a second embodiment of an elongate beam 134 for use in the invention. The elongate beam 134 is formed from two rods 70 and 72. The first, outside rod 70 extends through the sleeve 38 to the seat 32 and is aligned end-to-end with the second inner rod 72 that extends to the clevis 43. The abutting ends of the first and second rods 70, 72 include external threads 74, 76. The external threads 74 of the first outside rod 70 are preferably right-hand threads, and the external threads 76 of the second inner rod 72 are preferably lefthand threads. A cylinder 78 that includes two internally-threaded ends that match the threads 74, 76 of the first and second rods 70, 72 is threaded onto the abutting ends of the two rods. The cylinder includes a knurled gripping surface 79.

By grasping the cylinder 78 at the knurled gripping surface 79, a rider can twist the cylinder 78 to move apart or together the abutting ends of the first and second rods 70, 72. By adjusting the cylinder 78 in this manner, the distal end of the elongate beam 134, and therefore the seat 32, is adjusted upward or downward. In addition, rotation of the cylinder 78 can be used to "preload," or partially shear or deform, the shock absorber 40 before a rider loads the seat 32.

The height of the seat 32 can also be adjusted by using the lower pivot 37. As described in detail above, by loosening the nut 68 and the shoulder bolt 66, the pems 64 release the dog ear 50, and the slider 36 can be moved relative to the lower pivot 37. The distal end of the elongate beam 34 can then be pressed upward or downward until the slider 36 and elongate beam 34 are in a desired orientation. During this movement, the arcuate slot 52 slides along the shoulder bolt 66. The nut 68 and the shoulder bolt 66 of the lower pivot 37 are then tightened, and the arcuate slot 52 is locked into position relative to the lower pivot 37.

Preferably, the shock absorber 40, elongate beam 34, and slider 38 are formed so that when a rider sits on the seat 32, the seat moves downward, or preloads, approximately ¾ inch. During travel, the slider 36 moves relative to the seat so that the seat moves downward an additional 1¼ to 1½ inches, depending on the terrain and weight of the rider.

The frame 12 is preferably aluminum extrusion, but may be a composite, steel, or any other suitable material. The frame 12 shown does not include a conventional top tube, but instead, the front end of the frame is supported by the down tube 26. Although the frame 12 shown in the drawings does not include a conventional center tube, frame stays, or a top tube, the suspension system 30 could be used on a frame having one or more of these features.

If the frame is produced from aluminum or another metallic material, the chain stays 24 of the present invention preferably include a cutout section 94 on the internal part of the stay. The cutout section 94 provides an advantage if the frame 12 is formed from sheet aluminum. Typically, a frame is formed with solid chain stays. After welding, the chain stays often must be straightened to tolerance. When a frame 12 is formed having chain stays 24 formed as a solid piece, it is difficult to straighten the chain stays without bending the face of the chain stays out of parallel. In addition, warpage often occurs after bending which causes the chain stays to bend out of parallel. By providing the cutout section 94, a weakened portion of the chain stays is provided in the middle of the chain stays. The central weakened portion permits the chain stays 24 to be manipulated without warping the large flat planes.

FIGS. 8–13 disclose an alternate lower pivot 137 for the suspension system 30. In summary, the lower pivot 137 acts as an eccentric seat height adjustment system that, when loosened, rotates to adjust the distal end of the slider 36 fore and aft so as to adjust the seat height. When the seat is adjusted to a desired height, the lower pivot 137 is tightened to prevent further adjustment of the seat height, and to lock the distal end of the slider 36 in place. The slider 36 is free to rotate when the lower pivot 137 is locked in place, permitting operation of the slider and the elongate beam as described in the previous embodiment.

As can best be seen in FIG. 12, the lower pivot 137 fits within two tapered bosses 158 within the frame. The lower pivot 137 includes a left Morse taper 160 and a right Morse taper 162. A pin 164 extends between the left and right Morse tapers 160, 162 (FIG. 9). A pivot nut 166 is rotatably mounted on the pin 164. Because the two Morse tapers are identical, only the right Morse taper 162 will be described. The right Morse taper 162 includes a rounded outer face 168 (FIG. 9; rounded face of left Morse taper 160 shown). Extending rearward from adjacent the outer edges of the rounded outer face 168 is a cylinder 170. The cylinder 170 has a tapered section 171 that extends from the rounded outer face 168 to approximately two-thirds rearward on the cylinder. As can best be seen in FIG. 10, an inner cylinder 172 is eccentrically mounted on the inner circumference of the cylinder 170. The inner cylinder 172 extends from the rounded outer face 168 to the rear portion of the cylinder 170 (FIG. 12). An inner flange 174 extends inward radially from approximately the central portion of the inner cylinder 172.

To assemble the lower pivot 137, the pin 164 is inserted into the inner cylinder 172 of the right Morse taper 162. The pivot nut 166 is then placed over the exposed portion of the pin 164 (FIG. 9). The pivot nut 166 is free to rotate about the pin 164.

Figure 8:
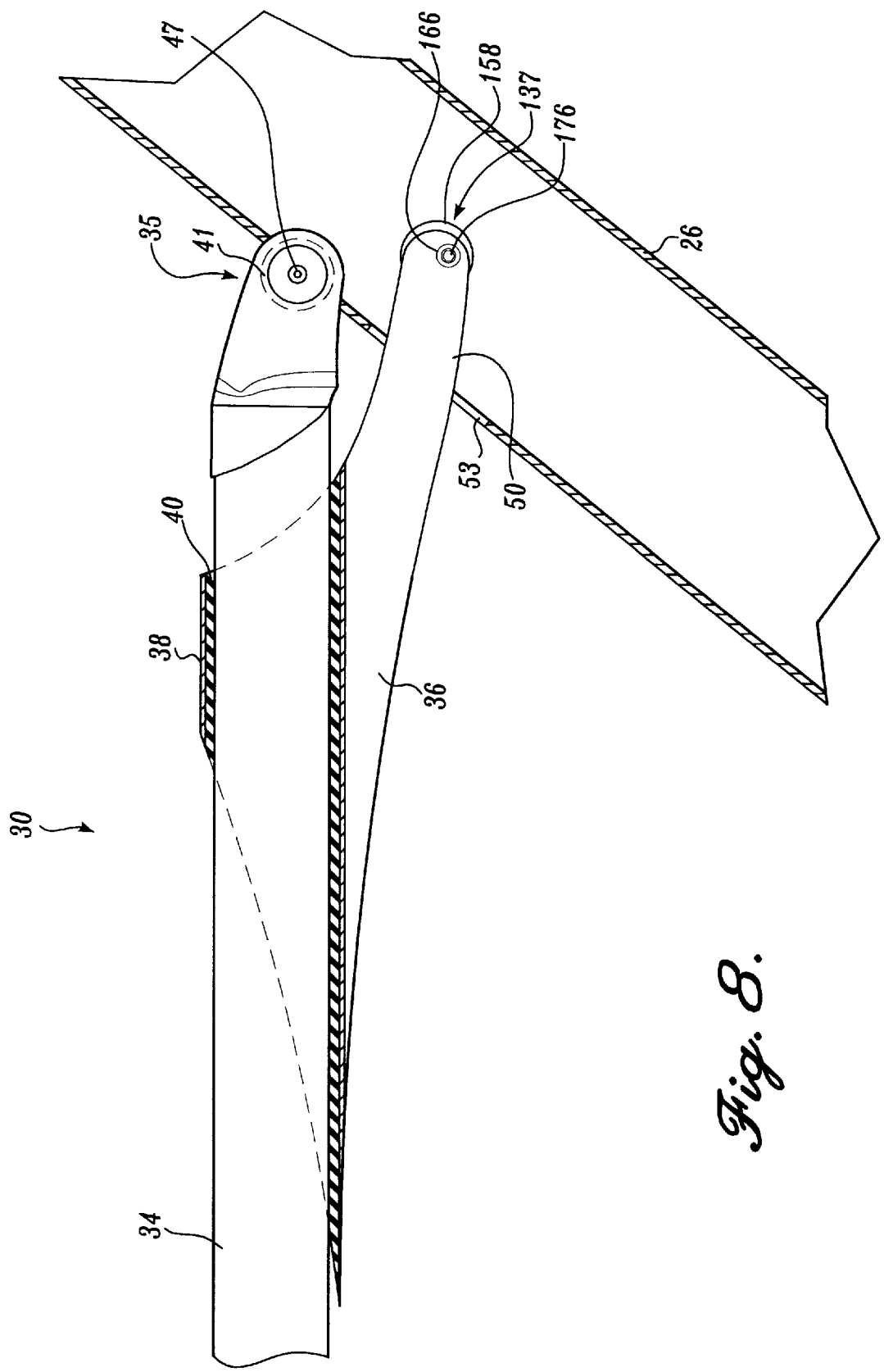
FIG. 8 is a side view of a second embodiment of a seat suspension system similar to FIG. 1, with part of the slider and part of the down tube of the bicycle removed for detail such as is shown in FIG. 3, and with a different lower pivot in place.

The pre-assembled right half of the lower pivot 137 is then ready for connection to the slider 36. The dog ear 50 is inserted into the down tube 26 so that it aligns with the bosses 158 (FIG. 8). The right Morse taper 162 is then inserted through the right side of the frame and the pivot nut 166 is extended into a notch 176 located at the distal end of the dog ear 50. The left Morse taper 160 is then inserted on the left side of the down tube 26 and aligned with the pin 164 so that the pin extends into the inner cylinder 172 of the left Morse taper 160. A bolt 178 (head shown in FIG. 13) is then extended through the inner cylinders 172 of the left and right Morse tapers 160, 162 and through the pin 164. A nut (not shown) is placed on the end of the bolt 178. The nut 180 and the bolt 178 rest against the outer surfaces of the inner flange 178 within the inner cylinder 172.

Figure 13:
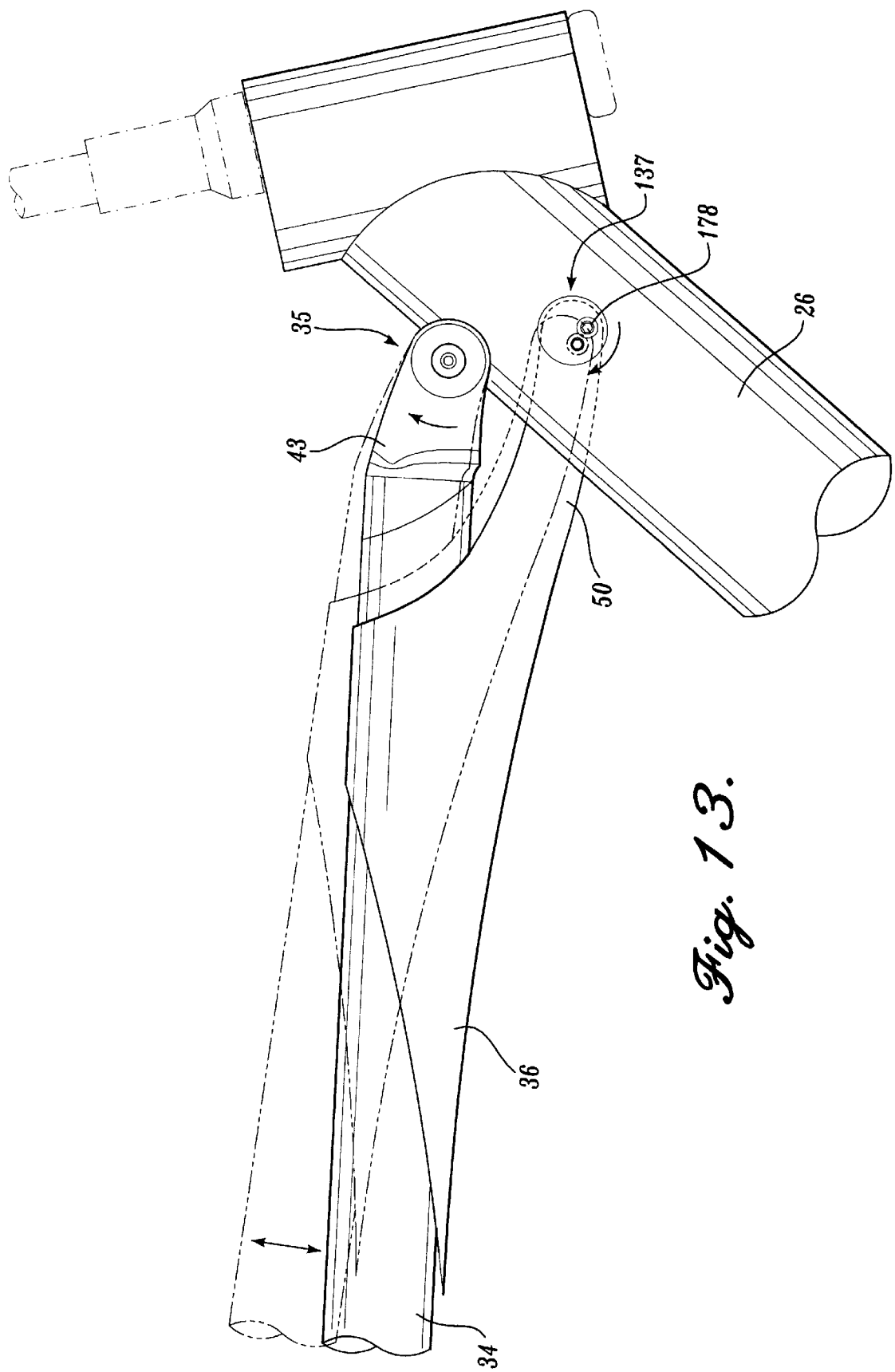
FIG. 13 is a side view of the down tube and seat suspension system of FIG. 8, showing movement of the lower pivot of FIG. 9.

Before the nut 180 and bolt 178 are tightened, the lower pivot 137 is free to rotate within the bosses 158. By rotating the portion of the lower pivot 137 corresponding to the bolt 178 (and therefore the pivot nut 166) toward the front of the down tube 26, the slider 36 and therefore the elongate beam 34 are slightly lowered as shown in FIG. 13. Likewise, if the bolt 178 is moved toward the rear of the down tube 26 (toward the left in FIG. 13), the elongate beam 34 is slightly raised.

Once a desired height for the elongate beam 34 has been established by rotation of the lower pivot 137, the nut 180 is tightened onto the bolt 178 so that the tapered sections 171 of the left and right Morse tapers 160, 162 are tightened against the tapered bosses 158. The friction between the tapered sections 171 and the tapered bosses 158 prevents further rotation of the lower pivot 137.

The abutment of the pin 164 against the inner surface of the inner flanges 174 and the inner cylinders 172 prevents the left and right Morse tapers 160, 162 from being overtightened and from entrapping and preventing rotation of the pivot nut 166. The attachment of the dog ear 50 via the notch 176 to the pivot nut 166 permits the slider 36 to freely rotate about the lower pivot 137 because the pivot nut 166 is allowed to spin freely about the pin 164. Thus, the lower pivot 137 works when fixed in place in much the same way as the lower pivot 37.

While this invention has been described in detail with particular reference to preferred embodiments thereof, it shall be understood that variations and modifications can be affected within the spirit and scope of the invention as described hereinbefore and as defined in the appended claims.

The embodiments of the invention in which an exclusive property or privilege is claimed are defined as follows:

1. A suspension system for suspending a seat of a vehicle, the suspension system comprising:
   an elongate beam having first and second ends, the first end having a first pivotal mount for attaching to a vehicle;
   a slider having a second pivotal mount for attaching to a vehicle, the slider including a sleeve spaced from the first pivotal mount, the elongate beam slidably received within the sleeve of the slider;

a seat mount attached adjacent to the second end of the elongate beam; and means for restricting sliding of the sleeve of the slider along the elongate beam.

2. The suspension system of claim 1, wherein the suspension system is configured for attachment to a down tube of a bicycle.

3. The suspension system of claim 1, wherein the first pivotal mount is arranged above the second pivotal mount.

4. The suspension system of claim 3, wherein the first pivotal mount is horizontally distanced closer to the seat mount than the second pivotal mount.

5. The suspension system of claim 1, wherein the means for restricting sliding comprises a shock absorber juxtaposed between the sleeve of the slider and the elongate beam.

6. The suspension system of claim 5, wherein the shock absorber comprises an elastomeric material.

7. The suspension system of claim 1, wherein the second pivotal mount comprises a clamp for selectively attaching the slider to a vehicle at at least two different locations whereby the location of the second pivotal mount is adjustable.

8. The suspension system of claim 1, further comprising means for adjusting the length of the beam intermediate the sleeve and the first end of the elongate beam.

9. The suspension system of claim 1, wherein the elongate beam comprises (1) a first rod extending from the first end of the elongate beam to a point intermediate the sleeve and the first end, (2) a second rod extending from the first rod to the second end of the elongate beam, and (3) an adjustable connector for selectively adjusting the length between the first and second rods, whereby the length of the elongate beam can be selectively adjusted.

10. The suspension system of claim 9, wherein the first and second rods include opposite direction external threads on the ends of the first and second rods closest to one another, and the connector comprises a cylinder having internally-threaded ends that match the threads of the first and second rods.

11. The suspension system of claim 1, wherein the second pivotal mount comprises an eccentric seat height adjustment system that, when loosened, rotates to adjust the distal end of the slider fore and aft so as to adjust the seat height.

12. The suspension system of claim 11, wherein the second pivotal mount is tightened to prevent adjustment of the seat height, and to lock the distal end of the slider in place, and the slider is free to rotate about the second pivotal mount when the second pivotal mount is locked in place.

13. A vehicle comprising:

a frame member;

an elongate beam having first and second ends, the first end pivotally mounted to the frame member at a first pivot point;

a slider pivotally mounted at a second pivot point on the frame member, the slider including a sleeve spaced from the second pivot point, the elongate beam slidingly received within the sleeve of the slider;

a seat mount attached to the second end of the elongate beam; and means for restricting sliding of the sleeve of the slider along the elongate beam.

14. The vehicle of claim 13, wherein the vehicle is a bicycle and the frame member is the down tube of the bicycle.

15. The vehicle of claim 13, wherein the first pivot point is located above the second pivot point.

16. The vehicle of claim 15, wherein the first pivot point is horizontally distanced closer to the seat mount than the second pivot point.

17. The vehicle of claim 13, wherein the means for restricting sliding comprises a shock absorber juxtaposed between the sleeve of the slider and the elongate beam.

18. The vehicle of claim 17, wherein the shock absorber comprises an elastomeric material.

19. The vehicle of claim 13, wherein the second pivotal mount comprises a clamp for selectively attaching the slider to a vehicle at at least two different locations whereby the location of the first pivotal mount is adjustable.

20. The vehicle of claim 13, further comprising means for adjusting the length of the beam intermediate the sleeve and the first end of the elongate beam.

21. The vehicle of claim 13, wherein the elongate beam comprises (1) a first rod extending from the first end of the elongate beam to a point intermediate the sleeve and the first end, (2) a second rod extending from the first rod to the second end of the elongate beam, and (3) an adjustable connector for selectively adjusting the length between the first and second rods, whereby the length of the elongate beam can be selectively adjusted.

22. The vehicle of claim 21, wherein the first and second rods include opposite direction external threads on the ends of the first and second rods closest to one another, and the connector comprises a cylinder having internally-threaded ends that match the threads of the first and second rods.

23. The suspension system of claim 13, wherein the second pivotal mount comprises an eccentric seat height adjustment system that, when loosened, rotates to adjust the distal end of the slider fore and aft so as to adjust the seat height.

24. The suspension system of claim 23, wherein the second pivotal mount is tightened to prevent adjustment of the seat height, and to lock the distal end of the slider in place, and the slider is free to rotate about the second pivotal mount when the second pivotal mount is locked in place.

25. A suspension system for suspending a seat of a vehicle, the suspension system comprising:

an elongate beam having first and second ends, the first end having a first pivotal mount for attaching to a vehicle;

a slider having a second pivotal mount for attaching to a vehicle, the slider including a sleeve spaced from the first pivotal mount, the elongate beam slidably received within the sleeve of the slider;

a seat mount attached adjacent to the second end of the elongate beam; and a shock absorber juxtaposed between the sleeve of the slider and the elongate beam, the shock absorber being designed to restrict sliding of the sleeve of the slider along the elongate beam.

26. A vehicle comprising:

a frame member;

an elongate beam having first and second ends, the first end pivotally mounted to the frame member at a first pivot point;

a slider pivotally mounted at a second pivot point on the frame member, the slider including a sleeve spaced from the pivot point, the elongate beam slidingly received within the sleeve of the slider;

a seat mount attached to the second end of the elongate beam; and a shock absorber juxtaposed between the sleeve of the slider and the elongate beam, the shock absorber being designed to restrict sliding of the sleeve of the slider along the elongate beam.

* * * * *